(12) United States Patent
Summers et al.

(10) Patent No.: US 11,277,379 B2
(45) Date of Patent: Mar. 15, 2022

(54) MODIFICATION OF APPLICATION-PROVIDED TURN SERVERS

(71) Applicant: Citrix Systems, Inc., Ft. Lauderdale, FL (US)

(72) Inventors: Jacob Jared Summers, Coral Springs, FL (US); Daniel G. Wing, Truckee, CA (US); Jeroen Mattijs van Rotterdam, Pompano Beach, FL (US)

(73) Assignee: Citrix Systems, Inc., Ft. Lauderdate, FL (US)

( * ) Notice: Subject to any disclaimer, the term of this patent is extended or adjusted under 35 U.S.C. 154(b) by 0 days.

(21) Appl. No.: 16/872,797

(22) Filed: May 12, 2020

(65) Prior Publication Data
US 2021/0359973 A1    Nov. 18, 2021

(51) Int. Cl.
| | |
|---|---|
| *G06F 15/16* | (2006.01) |
| *H04L 61/2557* | (2022.01) |
| *H04L 61/2589* | (2022.01) |
| *H04L 67/141* | (2022.01) |
| *H04L 67/02* | (2022.01) |
| *H04L 29/06* | (2006.01) |

(52) U.S. Cl.
CPC ...... *H04L 61/2557* (2013.01); *H04L 61/2589* (2013.01); *H04L 63/10* (2013.01); *H04L 67/02* (2013.01); *H04L 67/141* (2013.01)

(58) Field of Classification Search
CPC ..... H04L 61/2557; H04L 67/02; H04L 63/10; H04L 67/141; H04L 61/2589
USPC .......................................................... 709/245
See application file for complete search history.

(56) References Cited

U.S. PATENT DOCUMENTS

| | | | | |
|---|---|---|---|---|
| 7,899,932 B2* | 3/2011 | Takeda | ................ | H04L 61/1511 709/245 |
| 7,975,019 B1* | 7/2011 | Green | ................ | G06Q 30/0631 709/217 |
| 8,924,505 B2* | 12/2014 | Molland | ........... | H04L 29/08846 709/217 |
| 2002/0112076 A1* | 8/2002 | Rueda | .................... | H04L 61/10 709/245 |
| 2006/0224711 A1* | 10/2006 | Engel | ..................... | H04L 67/12 709/223 |

(Continued)

OTHER PUBLICATIONS

Jennings, C. et al., "REsource Location and Discovery (RELOAD) Base Protocol", Internet-Draft, Columbia University, Mar. 7, 2010, 153 pages.

(Continued)

*Primary Examiner* — Razu A Miah
(74) *Attorney, Agent, or Firm* — Finch & Maloney PLLC

(57) ABSTRACT

Techniques are provided for modifying a list of Traversal Using Relays around Network Address Translators (TURN) servers within a host application. A custom-modified browser is configured to add and/or remove TURN servers underneath a variety of host applications, including, for example, JavaScript WebRTC applications. In some cases, certain applications are permitted and/or denied use of certain TURN servers, based on local administrative policy. In accordance with another embodiment of the present disclosure, a host application can be configured or otherwise modified to use certain TURN servers on certain networks, for example, to prevent traffic from using a TURN server outside a General Data Protection Regulation (GDPR) region.

18 Claims, 11 Drawing Sheets

(56) References Cited

U.S. PATENT DOCUMENTS

| | | | | |
|---|---|---|---|---|
| 2008/0059639 A1* | 3/2008 | Zhang | ................ | H04L 67/1019 709/227 |
| 2008/0162637 A1* | 7/2008 | Adamczyk | ............ | H04L 51/043 709/204 |
| 2010/0115613 A1* | 5/2010 | Ramaswami | ....... | G06F 16/9574 726/22 |
| 2010/0192072 A1* | 7/2010 | Spataro | ................ | G06Q 10/107 715/753 |
| 2010/0217963 A1* | 8/2010 | Peterson | ................ | G06F 9/445 713/2 |
| 2010/0293297 A1* | 11/2010 | Perumal | ............. | H04L 61/2589 709/245 |
| 2011/0035503 A1* | 2/2011 | Zaid | ................... | H04L 63/0442 709/228 |
| 2011/0055392 A1* | 3/2011 | Shen | ................ | H04L 29/12528 709/225 |
| 2014/0180943 A1* | 6/2014 | Priddy, Jr | ............ | G06Q 10/105 705/319 |
| 2015/0058469 A1* | 2/2015 | Li | ...................... | H04L 61/2575 709/224 |
| 2015/0222850 A1* | 8/2015 | Apelqvist | ........... | H04L 65/1089 348/14.12 |
| 2015/0281294 A1* | 10/2015 | Nur | ....................... | H04L 67/104 348/14.03 |
| 2016/0028831 A1* | 1/2016 | Rantapuska | ........ | H04L 61/2585 709/228 |
| 2016/0094591 A1* | 3/2016 | Moore | ............... | H04L 65/1006 709/228 |
| 2016/0380860 A1* | 12/2016 | Singhal | ............... | H04L 43/0864 709/224 |
| 2016/0380966 A1* | 12/2016 | Gunnalan | ........... | H04L 61/2589 709/226 |
| 2017/0255884 A1* | 9/2017 | Visvanathan | ........ | G06Q 10/067 |
| 2018/0052677 A1* | 2/2018 | Lodeiro | .................. | G06F 8/654 |
| 2018/0376107 A1* | 12/2018 | Shibaev | ................ | G06F 3/0488 |
| 2019/0052558 A1 | 2/2019 | Mehta et al. | | |
| 2019/0362312 A1* | 11/2019 | Platt | .................... | H04L 65/1069 |
| 2020/0107226 A1* | 4/2020 | Raleigh | ................ | H04W 28/10 |

OTHER PUBLICATIONS

International Search Report and Written Opinion received in International Application No. PCT/US2021/028885 dated Jul. 9, 2021, 14 pages.

* cited by examiner

MODIFICATION OF APPLICATION-PROVIDED TURN SERVERS

BACKGROUND

In computing environments, real-time communication (RTC) is a collection of software protocols and hardware designed to provide responses to communication events within a guaranteed time constraint, often on the order of several milliseconds or less. RTC is useful for efficient messaging frameworks, such as text messaging, telephony, live video conferencing, screen sharing, control and monitoring of remote devices, location-based services, medical patient monitoring, and other applications requiring low latency communications. There are several existing RTC protocols. For example, WebRTC is a protocol that provides web browsers and mobile applications with RTC via application programming interfaces (APIs). WebRTC enables direct, peer-to-peer communication, which limits or eliminates delays that are potentially introduced by intermediary software and hardware. WebRTC applications can create bi-directional audio, video, and data connections over ephemeral User Datagram Protocol (UDP) ports between two WebRTC-capable devices, such as between two web browsers on a computer or smartphone, or between two dedicated WebRTC appliances (e.g., various thin clients such as voice-over-internet phones or Internet of Things (IoT) devices), or between the computer and a dedicated appliance. WebRTC can use peer-to-peer UDP connections to traverse the network for communication directly between peer devices. However, in some cases these peer-to-peer communications are relayed through intermediary services due to restrictions imposed by network firewalls or other products, and in some other cases the peers do not reside in the public Internet but rather in private address spaces behind Network Address Translators (NATs). When a peer, or endpoint, is behind a NAT, other endpoints rely on a relay to traverse the NAT. For example, WebRTC applications running in a web browser can utilize a list of Traversal Using Relays around NAT (TURN) servers that assist in the traversal of NATs or firewalls. The TURN server relays traffic from one peer to another, after the TURN server receives a request from the WebRTC client to relay that traffic. In a sense, a TURN server extends a UDP socket from the WebRTC endpoint to the TURN server.

SUMMARY

One example provides a method including receiving, by a first endpoint of a network, an application including a list of Traversal Using Relays around Network Address Translators (TURN) servers for traversing at least a portion of the network during bi-directional communications between the first endpoint and a second endpoint of the network, the list of TURN servers including a first TURN server and a second TURN server; causing, by the first endpoint, at least one of: a third TURN server specified by a policy to be added the list of TURN servers; and/or the first TURN server to be removed from the list of TURN servers such that the bi-directional communications between the first and second endpoints do not traverse the first TURN server removed from the list of TURN servers; and establishing, by the first endpoint, bi-directional communications with the second endpoint via at least the second TURN server or the third TURN server. In some cases, the method includes executing a browser modified to add the third TURN server to the list of TURN servers and/or to remove the first TURN server from the list of TURN servers. In some cases, the method includes executing an extension to the browser configured to add the third TURN server to the list of TURN servers and/or to remove the first TURN server from the list of TURN servers. In some cases, the method includes validating, by the first endpoint, that the policy authorizes that the application and/or a browser user to use at least the second or third TURN servers for the bi-directional communications. In some such cases, the method includes obtaining, by the first endpoint, TURN credentials in response to authorizing that that the application and/or a browser user to use at least the second or third TURN servers for the bi-directional communications. In some cases, the application includes a JavaScript WebRTC application. In some cases, the first TURN server is a public TURN server, and the second TURN server is a private TURN server.

Another example embodiment provides a system including a storage and at least one processor operatively coupled to the storage. The at least one processor is configured to execute instructions stored in the storage that when executed cause the at least one processor to carry out a process including receiving, by a first endpoint of a network, an application including a list of Traversal Using Relays around Network Address Translators (TURN) servers for traversing at least a portion of the network during bi-directional communications between the first endpoint and a second endpoint of the network, the list of TURN servers including a first TURN server and a second TURN server; causing, by the first endpoint, at least one of: a third TURN server specified by a policy to be added the list of TURN servers; and/or the first TURN server to be removed from the list of TURN servers such that the bi-directional communications between the first and second endpoints do not traverse the first TURN server removed from the list of TURN servers; and establishing, by the first endpoint, bi-directional communications with the second endpoint via at least the second TURN server or the third TURN server. In some cases, the process includes executing a browser modified to add the third TURN server to the list of TURN servers and/or to remove the first TURN server from the list of TURN servers. In some cases, the process includes executing an extension to the browser configured to add the third TURN server to the list of TURN servers and/or to remove the first TURN server from the list of TURN servers. In some cases, the process includes validating, by the first endpoint, that the policy authorizes that the application and/or a browser user to use at least the second or third TURN servers for the bi-directional communications. In some such cases, the process includes obtaining, by the first endpoint, TURN credentials in response to authorizing that that the application and/or a browser user to use at least the second or third TURN servers for the bi-directional communications. In some cases, the application includes a JavaScript WebRTC application. In some cases, the first TURN server is a public TURN server, and the second TURN server is a private TURN server.

Yet another example embodiment provides a computer program product including one or more non-transitory machine-readable mediums having instructions encoded thereon that when executed by at least one processor cause a process to be carried out. The process includes receiving, by a first endpoint of a network, an application including a list of Traversal Using Relays around Network Address Translators (TURN) servers for traversing at least a portion of the network during bi-directional communications between the first endpoint and a second endpoint of the network, the list of TURN servers including a first TURN server and a second TURN server; causing, by the first endpoint, at least one of: a third TURN server specified by a policy to be added the list of TURN servers; and/or the first TURN server to be removed from the list of TURN servers such that the bi-directional communications between the first and second endpoints do not traverse the first TURN server removed from the list of TURN servers; and establishing, by the first endpoint, bi-directional communications with the second endpoint via at least the second TURN server or the third TURN server. In some cases, the process includes executing a browser modified to add the third TURN server to the list of TURN servers and/or to remove the first TURN server from the list of TURN servers. In some cases, the process includes executing an extension to the browser configured to add the third TURN server to the list of TURN servers and/or to remove the first TURN server from the list of TURN servers. In some cases, the process includes validating, by the first endpoint, that the policy authorizes that the application and/or a browser user to use at least the second or third TURN servers for the bi-directional communications. In some such cases, the process includes obtaining, by the first endpoint, TURN credentials in response to authorizing that that the application and/or a browser user to use at least the second or third TURN servers for the bi-directional communications. In some cases, the application includes a JavaScript WebRTC application.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

General Overview

RTC applications typically maintain a list of one or more TURN (relay) servers for use during peer-to-peer communications. TURN servers act as relays that receive data from one endpoint and forward that data to another endpoint. In this manner, each endpoint uses the publicly available address of the TURN server(s) rather than the addresses of the endpoints, which may not be directly reachable from the endpoint. The list of TURN servers is supplied by a host application, such as a JavaScript application. However, there are several non-trivial limitations associated with RTC protocols, such as WebRTC. For instance, WebRTC does not provide the ability to selectively allow, or whitelist, certain enterprise-approved WebRTC applications to operate while blocking, or blacklist, other non-approved WebRTC applications. Also, in certain jurisdictions subject to the General Data Protection Regulation (GDPR), it is illegal for traffic to leave the GDPR geographic region, which means relaying through a TURN server outside the GDPR geographic region is a GDPR regulatory violation. In yet other circumstances, virtual local area networks (VLANs) within a corporate network can be used to separate network traffic; however, there is no mechanism for WebRTC calls be routed optimally between those VLANs without traversing through a TURN server on the Internet. Often, the list of TURN servers is encoded with the application by the application developer and no provisions are made for end-user modifications to the list. In this scenario, the developer typically modifies the application when TURN servers are added or removed from the list, which can be expensive and inefficient especially when the developer is a vendor or other non-enterprise party.

To this end, techniques are provided for modifying a list of TURN servers within a host application. In accordance with an embodiment of the present disclosure, a custom-modified browser is configured to add and/or remove TURN servers underneath a variety of host applications, including, for example, JavaScript WebRTC applications. In some cases, certain applications are permitted and/or denied use of certain TURN servers, based on local administrative policy. In accordance with another embodiment of the present disclosure, a host application can be configured or otherwise modified to use certain TURN servers on certain networks, for example, to prevent traffic from using a TURN server outside a GDPR region.

Figure 1:
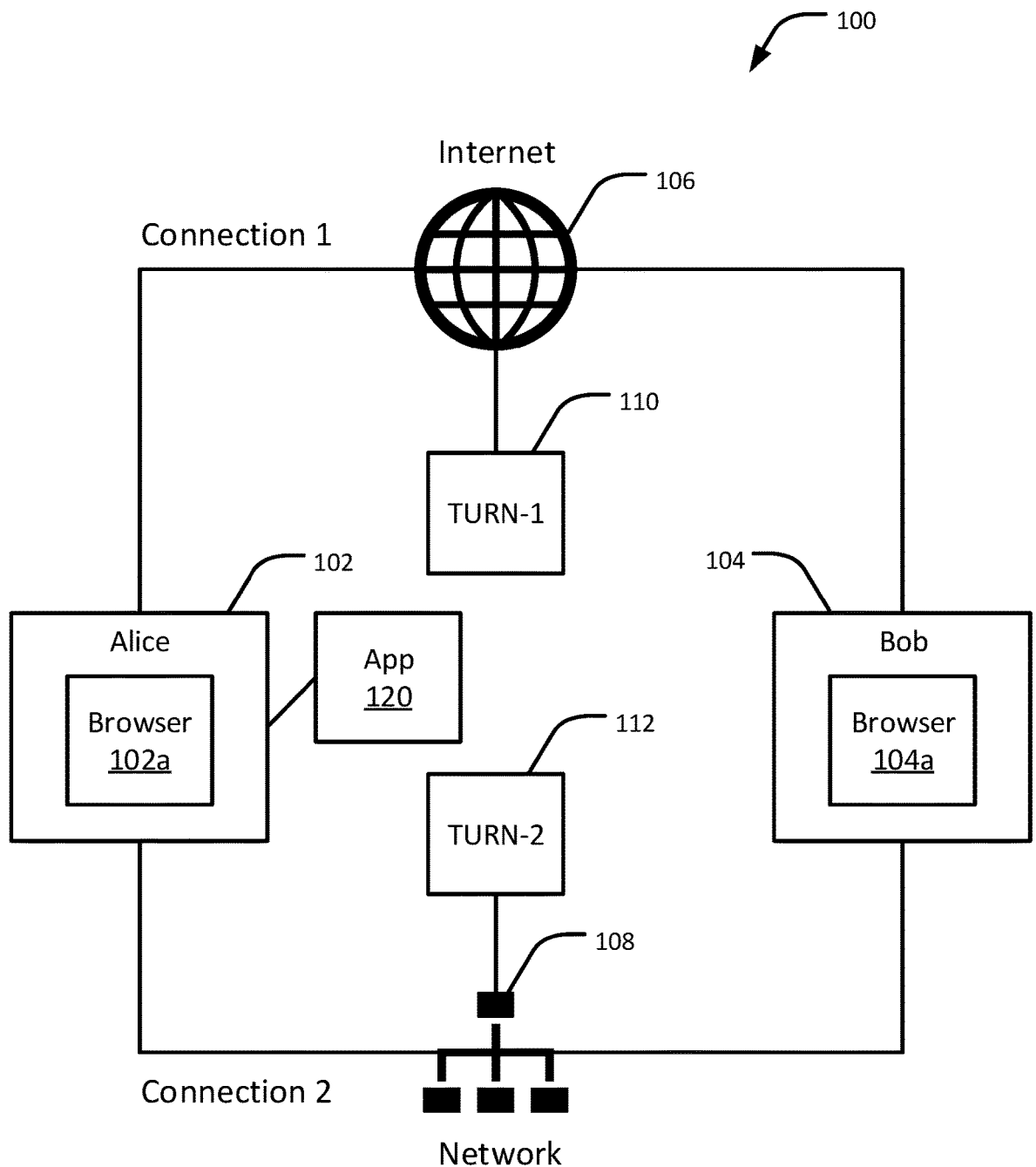
FIG. 1 is a schematic diagram of an example network utilizing TURN servers.

FIG. 1 is a schematic diagram of an example network 100 utilizing TURN servers. The network 100 is connected to two RTC peers, or endpoints, Alice 102 and Bob 104, via the Internet 106 and a network 108. The network 108 can, for example, include a local area network (LAN), a metropolitan area network (MAN), a wide area network (WAN), a public network, a private network, a cellular network, a wireless local-area network (WLAN), or other suitable communication network. The endpoints 102 and 104 are each configured to execute a browser 102a and 104a, respectively. The browser 102a, 104a, is configured to establish, in conjunction with a host application 120, bi-directional communications between the endpoints 102 and 104 via one or more TURN servers. A first TURN server 110 is connected to the Internet 106, and a second TURN server 112 is connected to the network 108. In some embodiments, the first TURN server 110 and the second TURN server 112 are specified by the host application for bi-directional communication between Alice 102 and Bob 104 over the network 100. Interactive Connectivity Establishment (ICE) is a process for determining all possible communication options between the two endpoints Alice 102 and Bob 104 (through any NATs and firewalls), including using TURN servers as relays. In this configuration, there are at least two possible connections between Alice 102 and Bob 104: Connection 1 via the Internet 106 and Connection 2 via the network 108. In addition to different routes, each connection may have a different end-to-end delay or transmission time. For example, the end-to-end delay for Connection 2 via the network may be shorter than the end-to-end delay for Connection 1 via the Internet 106. In this example, the faster TURN path, utilizing the second TURN server 112, can be automatically selected by the ICE process running in the RTC endpoints Alice 102 and Bob 104.

Figure 2:
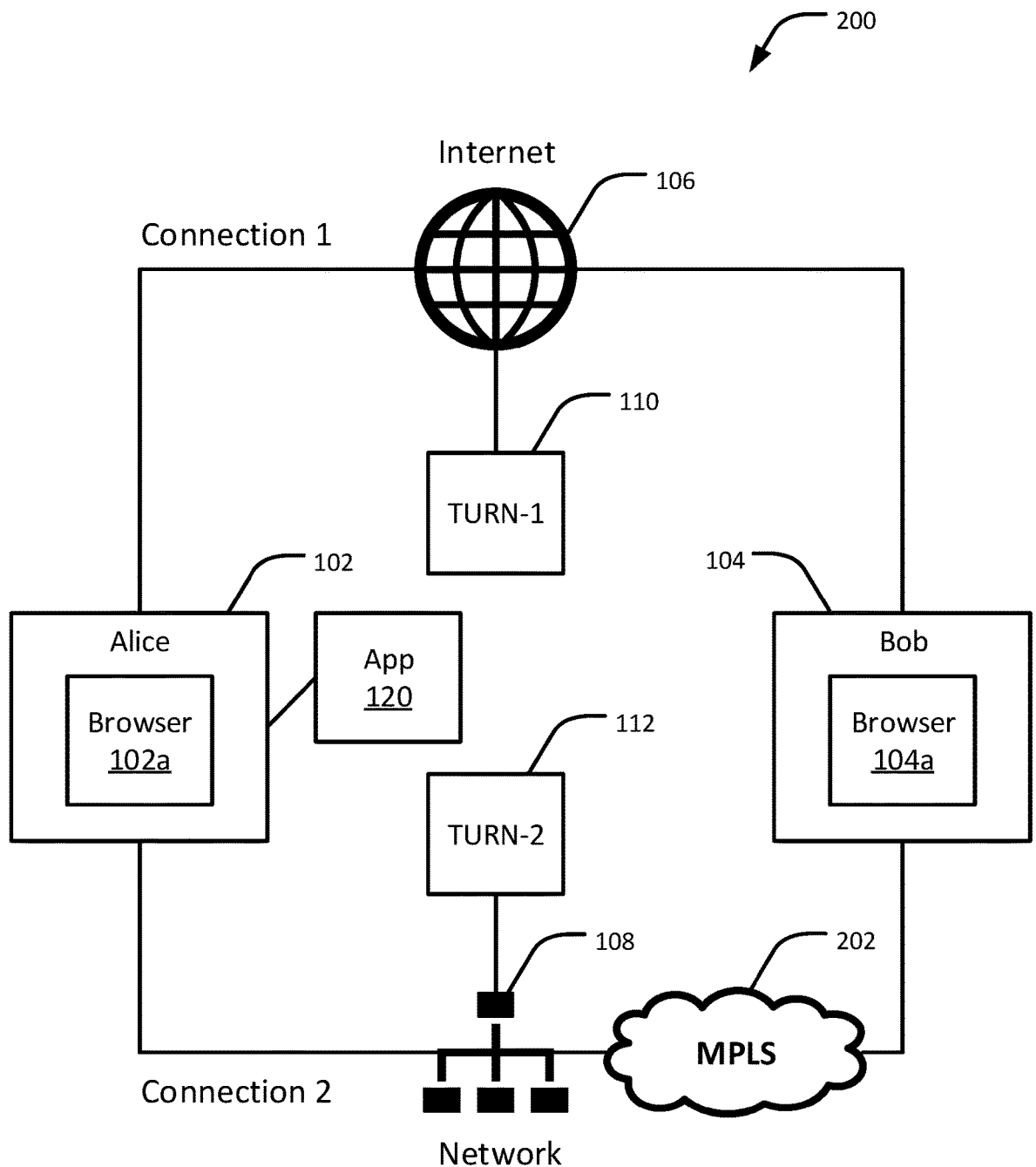
FIG. 2 is a schematic diagram of another example network utilizing TURN servers.

FIG. 2 is a schematic diagram of another example network 200 utilizing TURN servers. The network 200 is connected to two RTC peers, or endpoints, Alice 102 and Bob 104, via the Internet 106 and the network 108, such as described with respect to FIG. 1. The endpoints 102 and 104 are each configured to execute a browser 102a and 104a, respectively. The browser 102a, 104a, is configured to establish, in conjunction with a host application, bi-directional communications between the endpoints 102 and 104 via one or more TURN servers. A first TURN server 110 is connected to the Internet 106, and a second TURN server 112 is connected to the network 108. In some embodiments, the first TURN server 110 and the second TURN server 112 are specified by the host application for bi-directional communication between Alice 102 and Bob 104 over the network 200. In this configuration, there are at least two possible connections between Alice 102 and Bob 104: Connection 1 via the Internet 106 and Connection 2 via Multiprotocol Label Switching (MPLS) on the network 108. MPLS is a routing technique that encapsulates packets of various network protocols and directs those packets based on short path labels rather than long network addresses, which can increase data transmission speed. Thus, in addition to different routes, each connection may have a different end-to-end delay or transmission time. For example, the end-to-end delay for Connection 2 via the network may be shorter than the end-to-end delay for Connection 1 via the Internet 106. In this example, the faster TURN path, utiliz-ing the second TURN server 112, can be automatically selected by the ICE process running in the RTC endpoints Alice 102 and Bob 104.

Customized Browser and Policy Server for Adding and/or Removing a TURN Server

In accordance with an embodiment of the present disclosure, a TURN server can be added (injected) and/or removed from a list of TURN servers provided by an application (e.g., a JavaScript application) by modifying a browser to perform these operations. For example, the first TURN server 110 and/or the second TURN server 112, shown in FIGS. 1 and 2, may be specified in a list of TURN servers provided by the application, which is downloaded to the endpoints (e.g., Alice 102 and/or Bob 104). However, in some instances it may be desirable to add and/or remove one or more TURN servers from the list provided by the application. Modifying the browser is an alternative to modifying the application that is downloaded to the endpoint. For example, the browser can be modified by an end-user to create a custom browser build or by executing a browser extension. However, it will be understood that in some embodiments, the application (e.g., a JavaScript application) can be modified after it is downloaded (or while it is being downloaded) to the endpoint to add and/or remove one or more of the TURN servers from the list provided by the application.

Figure 3:
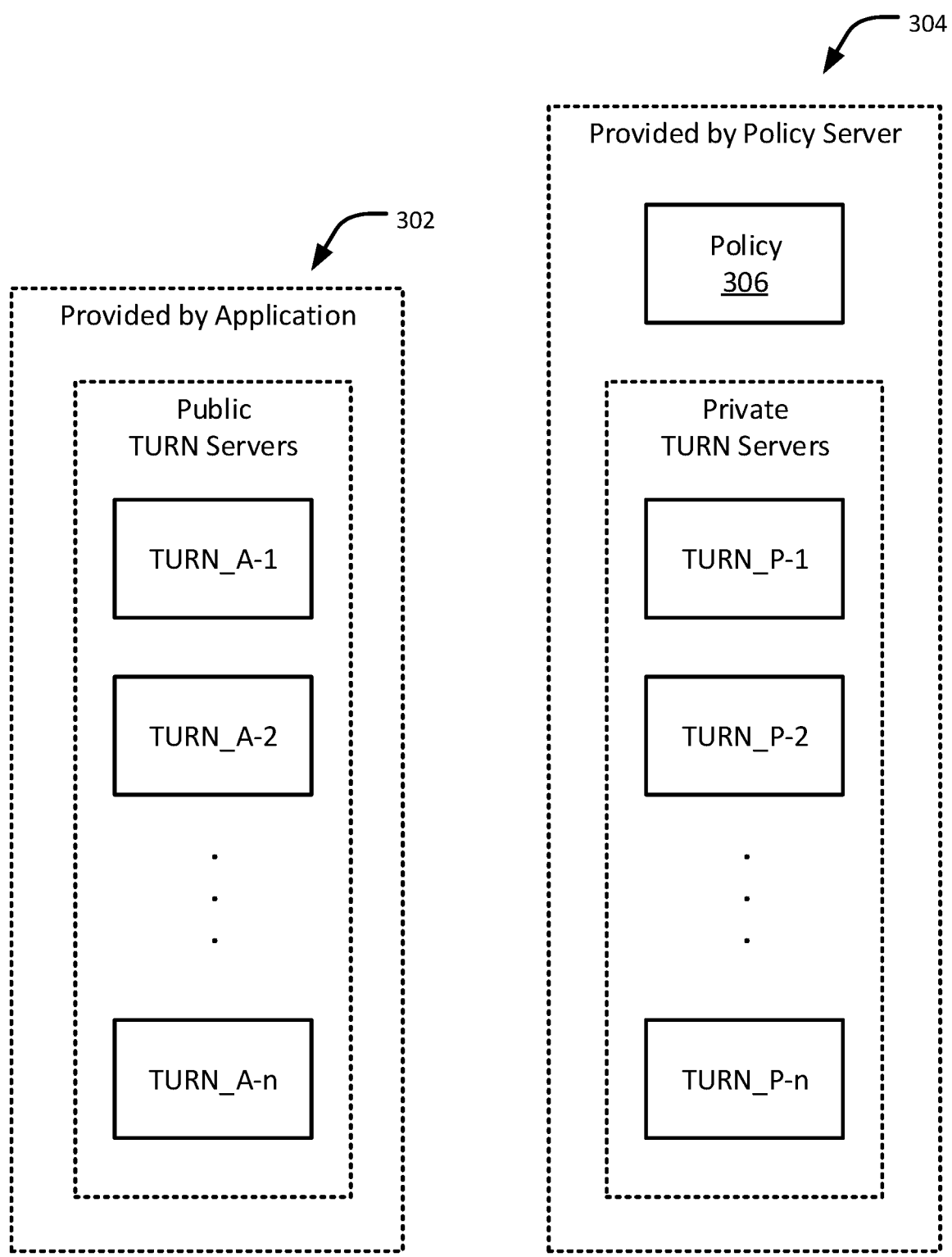
FIG. 3 shows a list of TURN servers provided by an application and a list of TURN servers provided by a policy server, in accordance with an embodiment of the present disclosure.

FIG. 3 shows a list of TURN servers provided by an application 120 and a modified list of TURN servers provided by a policy server 304, in accordance with an embodiment of the present disclosure. As noted above, an application can use one or more TURN servers to facilitate communications between peers or endpoints of a network. Typically, the TURN servers are public TURN servers specified by the application 120 (e.g., TURN_A-1, TURN_A-2, . . . , TURN_A-n). In accordance with an embodiment, the policy server 304 can provide a policy 306 that specifies whether any of the TURN servers specified by the application 120 should be removed from the list of TURN servers used by the application 120 and/or any private TURN servers (e.g., TURN_P-1, TURN_P-2, . . . , TURN_P-n) should be added to the list of TURN servers used by the application 120. In some examples, the policy 306 can specify that the application 120 is blocked from using one or more of the TURN servers.

Figure 4:
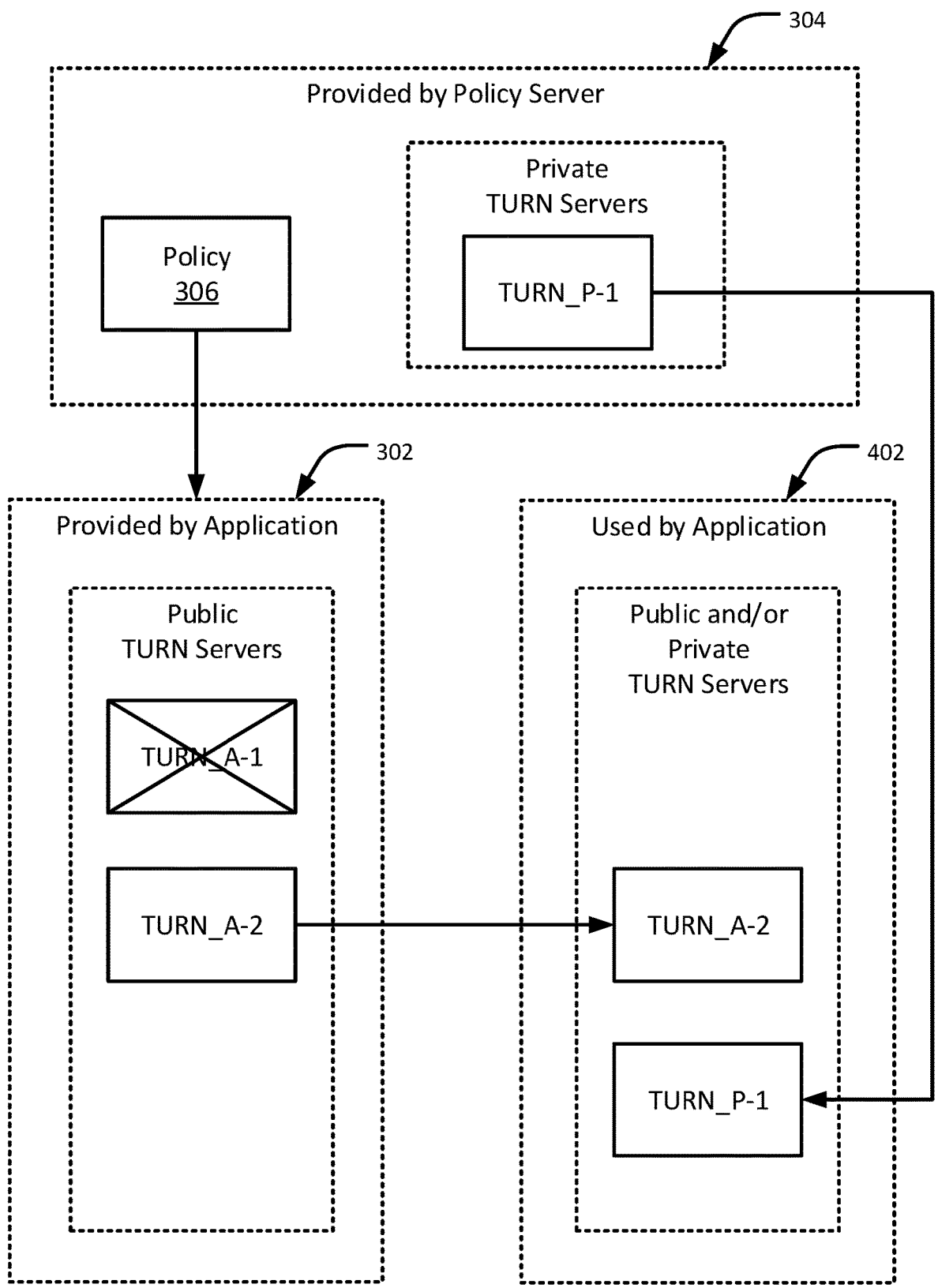
FIG. 4 shows an example implementation of the policy, in accordance with an embodiment of the present disclosure.
Figure 5A:
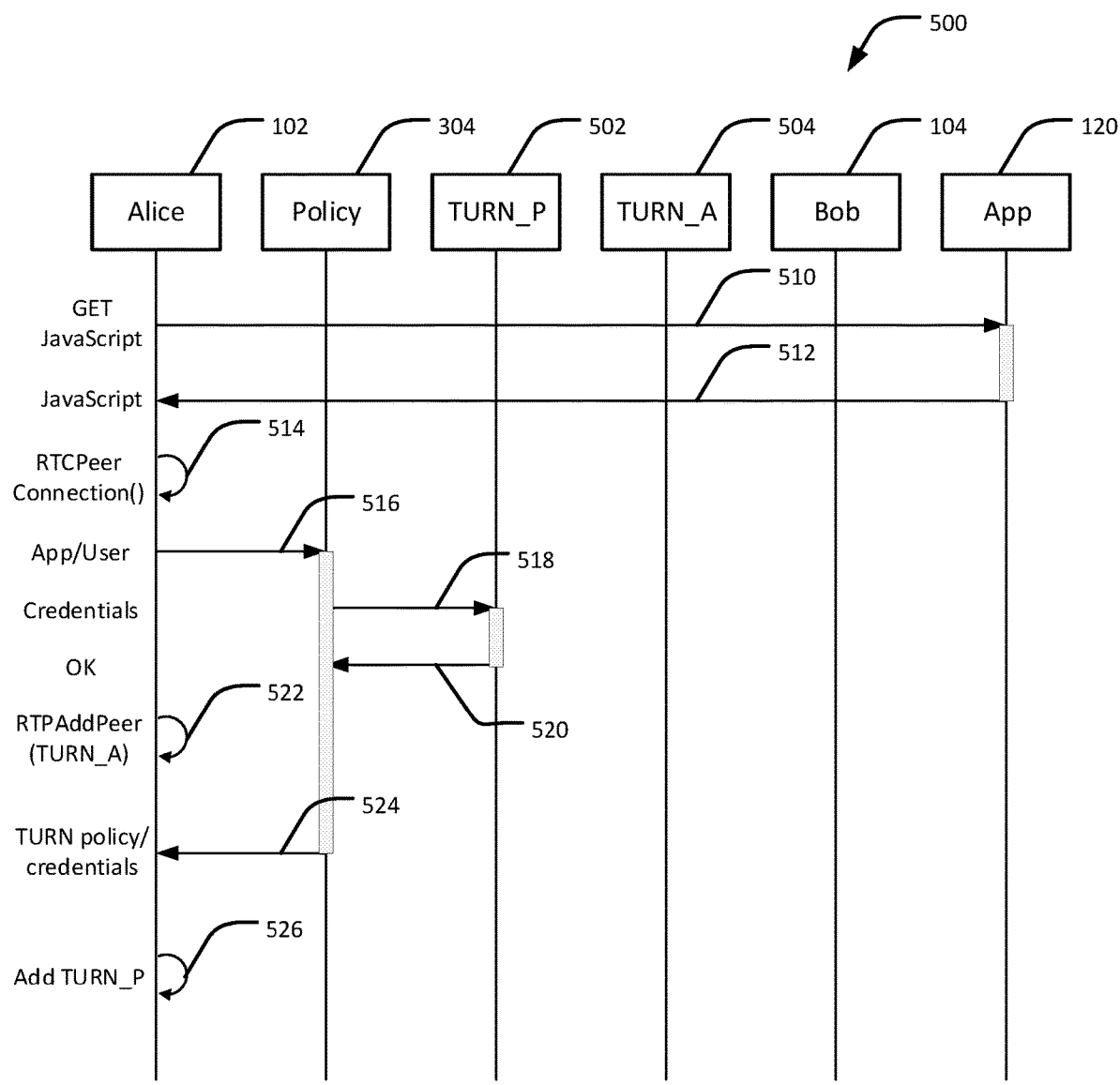
FIGS. 5A-B show a ladder diagram of an example method for modifying a list of TURN servers associated with a host application, in accordance with an embodiment of the present disclosure.
Figure 5B:
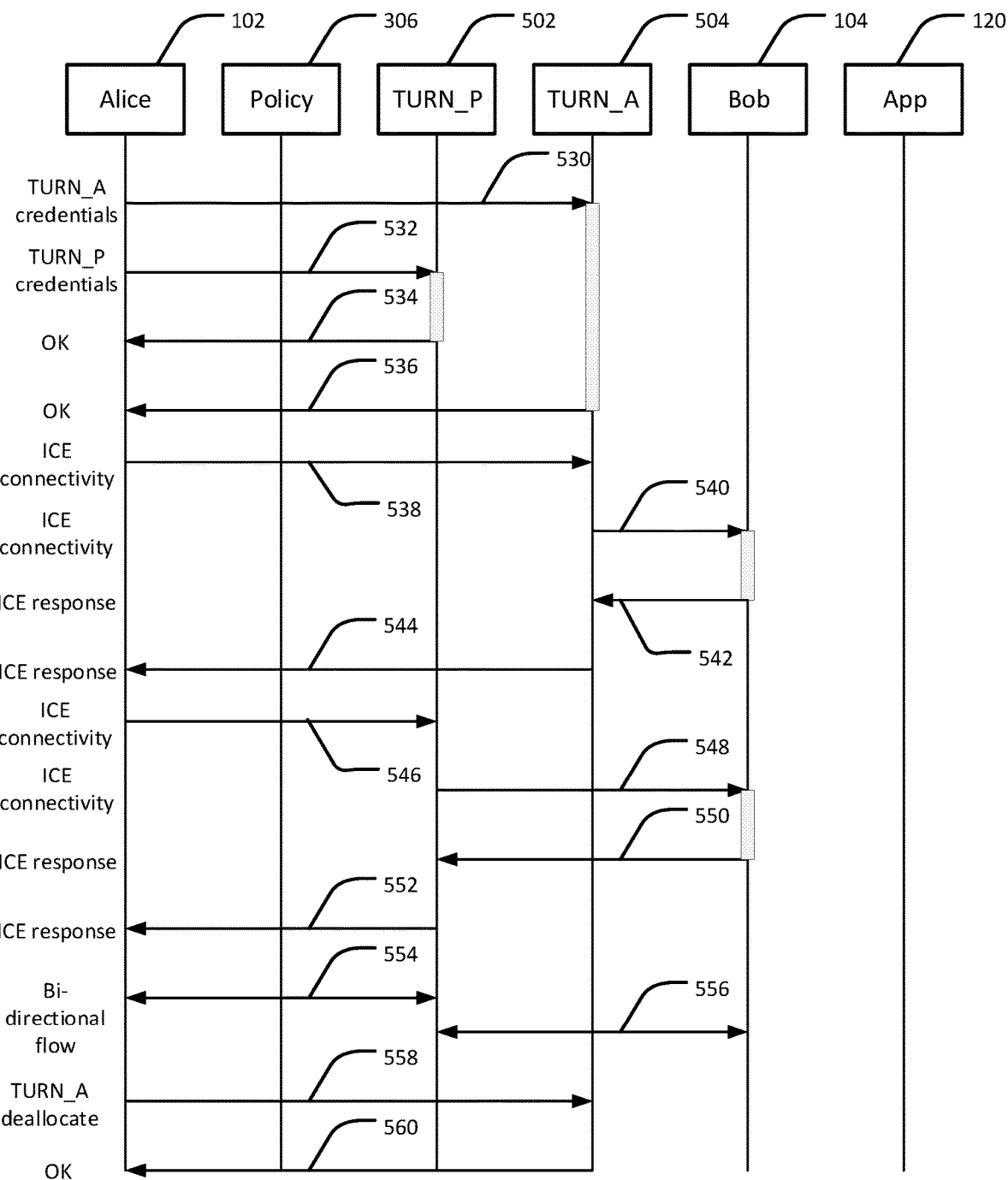

The browser can be modified to intercept (or block) an RTPAddPeer( ) JavaScript call (for initializing communications with another peer) and to add or remove TURN servers from the list of TURN servers provided by the application, such as described in further detail with respect to FIGS. 4, 5A and 5B. TURN servers, including those added and/or removed by the modified browser, need to have each connection authenticated and authorized. This is performed by the modified browser communicating the application name to a policy server. The application name is, for example, the Uniform Resource Locator (URL) of the application that was loaded by the browser and that made the RTPAddPeer( ) call. The policy server communicates with the TURN server either on a per-call basis, or periodically (e.g., daily, weekly, monthly, etc.) to get and refresh authorization tokens with the TURN server. In some embodiments, OAUTH protocol can be used for authentication. The modified browser obtains the necessary TURN credentials (e.g., Windows registry, local configuration file, remote web page) in response to validating with the policy server that the browser user and the downloaded application are authorized by the policy to use that TURN server.

The policy server can be configured with multiple settings for each application, as described below:

1) Augment (add) TURN server, which causes the list of TURN servers to be added to the application-provided list. The ICE process checks in the WebRTC application and chooses the path that works fastest: direct peer-to-peer, the application-provided TURN servers, or the augmented TURN servers.

2) Remove existing, application-provided TURN servers. This causes the application-provided TURN servers to be removed and only the augmented TURN servers to be used. This is useful in GDPR situations or other situations where the administrator does not want the application-provided TURN servers used at all.

3) Remove TURN servers if they are in a foreign regulatory jurisdiction (e.g., for GDPR). For example, if the user is in the USA and the TURN server is in Russia, then the Russian TURN server is removed to prevent network traffic from using the Russian TURN server; for another example if user is in France and TURN server is in the USA, then US TURN server is removed to prevent network traffic from using the US TURN server.

4) Do not inject (use) any TURN servers, for example if the application is not preferred by the IT administrator, then the enterprise's TURN server bandwidth and resources should not be used to improve that WebRTC application responsiveness.

5) Disallow the application entirely. This prevents all ICE connectivity checks so that the application fails to establish connectivity with its peer. An IT administrator can, for example, blacklist certain applications using this setting.

FIG. 4 shows an example implementation of the policy 306, in accordance with an embodiment of the present disclosure. In this example, the application 120 provides a list of public TURN servers TURN_A-1 and TURN_A-2, and the policy server 304 provides a list of private TURN servers including TURN_P-1. The policy 306 specifies that the TURN servers used by the application 402 should not use public TURN server TURN_A-1 and that the application 402 should use the private TURN server TURN_P-1. As a result, the public TURN server TURN_A-1 is removed from the list of TURN servers used by the application 120, and the private TURN server TURN_P-1 is added to the list of TURN servers used by the application 120, in addition to the public TURN server TURN_A-2 provided by the application.

Example Methodology

FIGS. 5A-B show a ladder diagram of an example method 500 for modifying a list of TURN servers associated with a host application (e.g., a JavaScript application), in accordance with an embodiment of the present disclosure. The method 500 includes adding a TURN server, TURN_P 502, to the list of TURN servers provided by the host application 120 according to a policy established for the communication session of the application 120 between endpoints Alice 102 and Bob 104. It will be understood that not all protocol steps are necessarily shown.

In FIGS. 5A-B, Alice 102 is executing a modified browser which communicates with the policy server. The application provides a list of one or more TURN servers. The browser is configured to enable modification of the list of TURN servers by adding and/or removing one or more TURN servers to and from the list according to the policy. The policy server is responsible for specifying existing TURN servers, provided by the host application, that should be removed (that is, not used) from the list of TURN servers for certain RTC calls made by the application. The policy server is also responsible for obtaining IP addresses and credentials for any TURN servers to be added to the list. The policy server provides the information about TURN servers to be added and/or removed to the browser.

The policy server coordinates authorization with the TURN server(s) and notifies the browser of the application-provided TURN servers that should be removed from the list. In some examples, this notification takes the form of a list of TURN servers that should be on the list after all modifications are complete. For example, the policy may cause the browser to remove existing TURN servers (e.g., TURN_A) from the list of TURN servers, such as when needed for regulatory compliance (GDPR).

Referring to FIG. 5A, the method 500 begins with Alice, an endpoint, 102 sending a GET JavaScript request 510 to retrieve the JavaScript code 512 for the application 120, which includes a list of TURN servers for use by the application 120. For example, the list of TURN servers includes the public TURN server TURN_A 504. Alice 102 then issues an RTCPeerConnection( ) call 514 for establishing communications with Bob 104, another endpoint. Next, Alice 102 sends an application and user call 516 to a policy server 304 to obtain a policy 306 for adding or removing TURN servers from the list of TURN servers provided by the JavaScript application 512. For example, the policy 306 may include adding a private TURN server TURN_P 502 to the list of TURN servers for use by the application 120. The policy server 304 authenticates the user by sending credentials 518 to TURN_P 502, which responds with an OK message 520 if the credentials are verified.

Next, Alice 102 issues an RTCAddPeer(TURN_A) call 522, which adds the public TURN server TURN_A 504 to the list of TURN servers for use by the application 120. The policy server 304 returns to Alice 102 the TURN server policy 524, which, in this example, includes adding the private TURN server TURN_P 502 to the list of TURN servers for use by the application 120. Alice 102 then issues an RTCAddPeer(TURN_P) call 526, which adds the private TURN server TURN_P 502 to the list of TURN servers for use by the application 120. At this point, the list of TURN servers for use by the application 120 includes TURN_A 504 and TURN_P 502, per the TURN server policy 524.

Referring to FIG. 5B, the method 500 further includes sending user credentials 520 from Alice 102 to TURN_A 502 and sending credentials 532 from Alice 102 to TURN_P 502. TURN_P 502 responds with an OK message 534 if the credentials are verified, and TURN_A 504 responds with an OK message 536 if the credentials are verified. Next, Alice 102 issues an ICE connectivity call 538 to TURN_A 504 and an ICE connectivity call 546 to TURN_P. In turn, TURN_A 504 issues an ICE connectivity call 540 to Bob 104 and TURN_P issues an ICE connectivity call 548 to Bob 104. Bob 104 responds with an ICE response 542 to TURN_A and an ICE response 550 to TURN_P. In turn, TURN_A responds with an ICE response 544 to Alice 102 and TURN_P responds with an ICE response 552 to Alice 102. The ICE connectivity calls 538, 540, 546 and 548, and the ICE responses 542, 544, 550 and 552 are used to establish bi-directional communications between Alice 102 and Bob 104.

Having established bi-directional communications between Alice 102 and Bob 104 via TURN_A 504 and TURN_P 502, bi-directional data flow 554, 556 can occur between Alice 102 and Bob 104 via TURN_P 502 and/or TURN_A 504 to traverse the network. After the bi-directional data flow 554, 556 has completed, Alice 102 can issue a TURN_A deallocate call 558 to TURN_A 504, which acknowledges with an OK message 560 to Alice 102.

Figure 6:
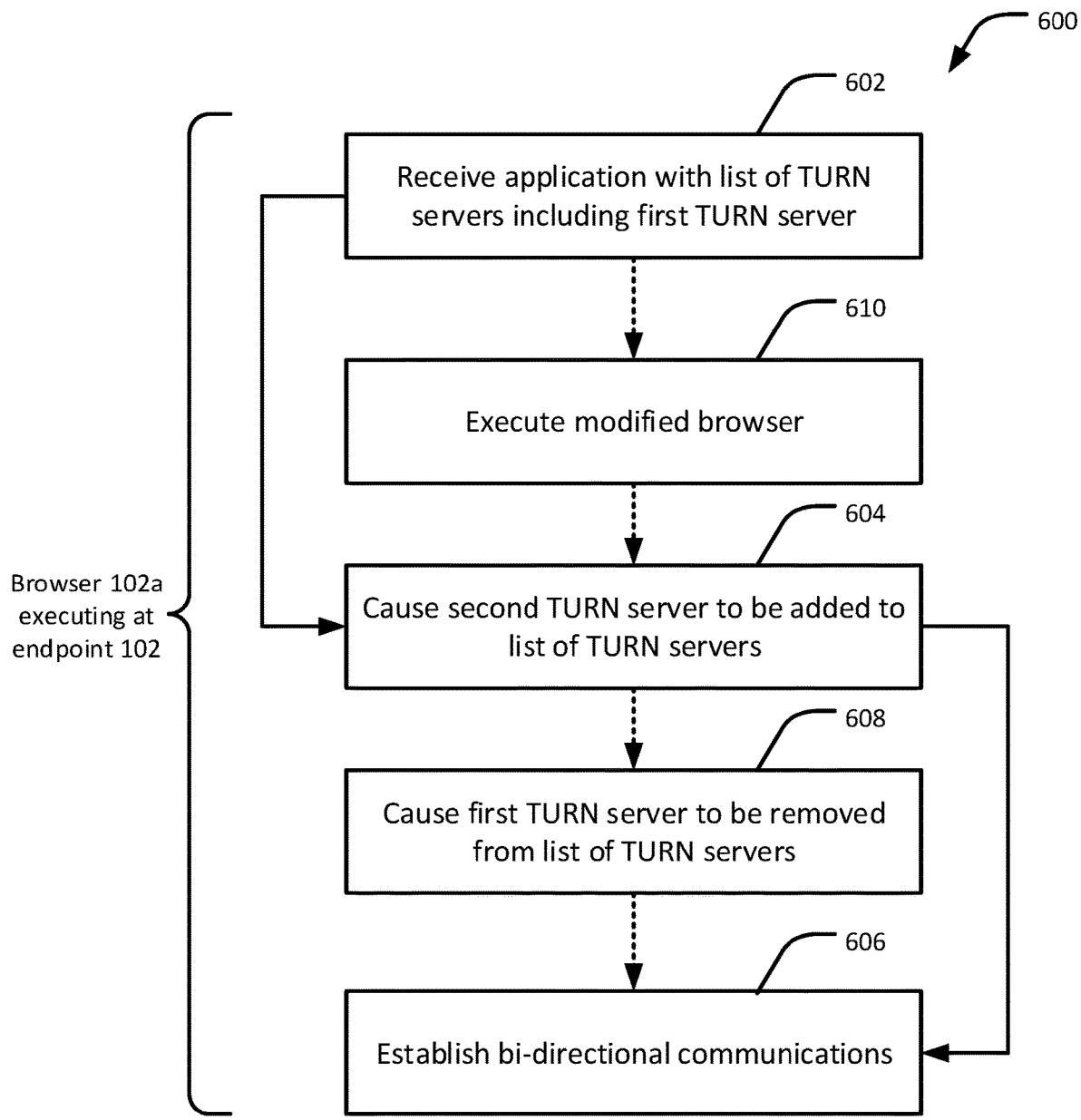
FIG. 6 is a flow diagram of an example method for adding and/or removing a TURN server, in accordance with an embodiment of the present disclosure.

FIG. 6 is a flow diagram of an example method 600 for adding and/or removing a TURN server, in accordance with an embodiment of the present disclosure. The method 600 can be implemented, for example, by a browser 102a, 104a or an application 120 executing at the endpoints Alice 102 or Bob 104, as described with respect to FIGS. 1 and 2. The method 600 includes receiving 602, by a first endpoint of a network, an application (such as application 120 of FIGS. 1, 2 and 5A-B) including a list of TURN servers for traversing at least a portion of the network during bi-directional communications between the first endpoint and a second endpoint of the network. The list of TURN servers can include a first TURN server. The method 600 further includes causing 604, by the first endpoint, a second TURN server specified by a policy to be added the list of TURN servers. For example, the second TURN server may not be included in the original list of TURN servers provided by the application, but the policy specifies that the second TURN server should be added to the list of TURN servers after the application has been downloaded to the endpoint (e.g., Alice 102 and/or Bob 104). The method 600 further includes establishing 606, by the first endpoint, bi-directional communications with the second endpoint via at least the second TURN server, which was added to the list of TURN servers (e.g., by a browser).

In some embodiments, the method 600 includes causing 608, by the first endpoint, the first TURN server to be removed from the list of TURN servers such that the bi-directional communications between the first and second endpoints do not traverse the first TURN server removed from the list of TURN servers. In some embodiments, the method 600 includes executing 610, by the first endpoint, a browser configured to add the second TURN server to the list of TURN servers and/or to remove the first TURN server from the list of TURN servers, in accordance with the policy. The browser can be modified as described in this disclosure to add and/or remove TURN servers from a list of TURN servers provided by an application. For example, in some embodiments the method 600 can include modifying source code used to build the browser to configure the browser to receive, parse, and apply lists provided by the policy server (e.g., policies that specify addition of the second TURN server to the list of TURN servers and/or removal of the first TURN server from the list of TURN servers). In another example, in some embodiments the method 600 can include executing an extension to the browser to configure the browser apply lists as described above. Application of the list can, for example, add the second TURN server to the list of TURN servers and/or to remove the first TURN server from the list of TURN servers. In some embodiments, the application includes a JavaScript WebRTC application. In some embodiments, the first TURN server is a public TURN server, and the second TURN server is a private TURN server.

Figure 7:
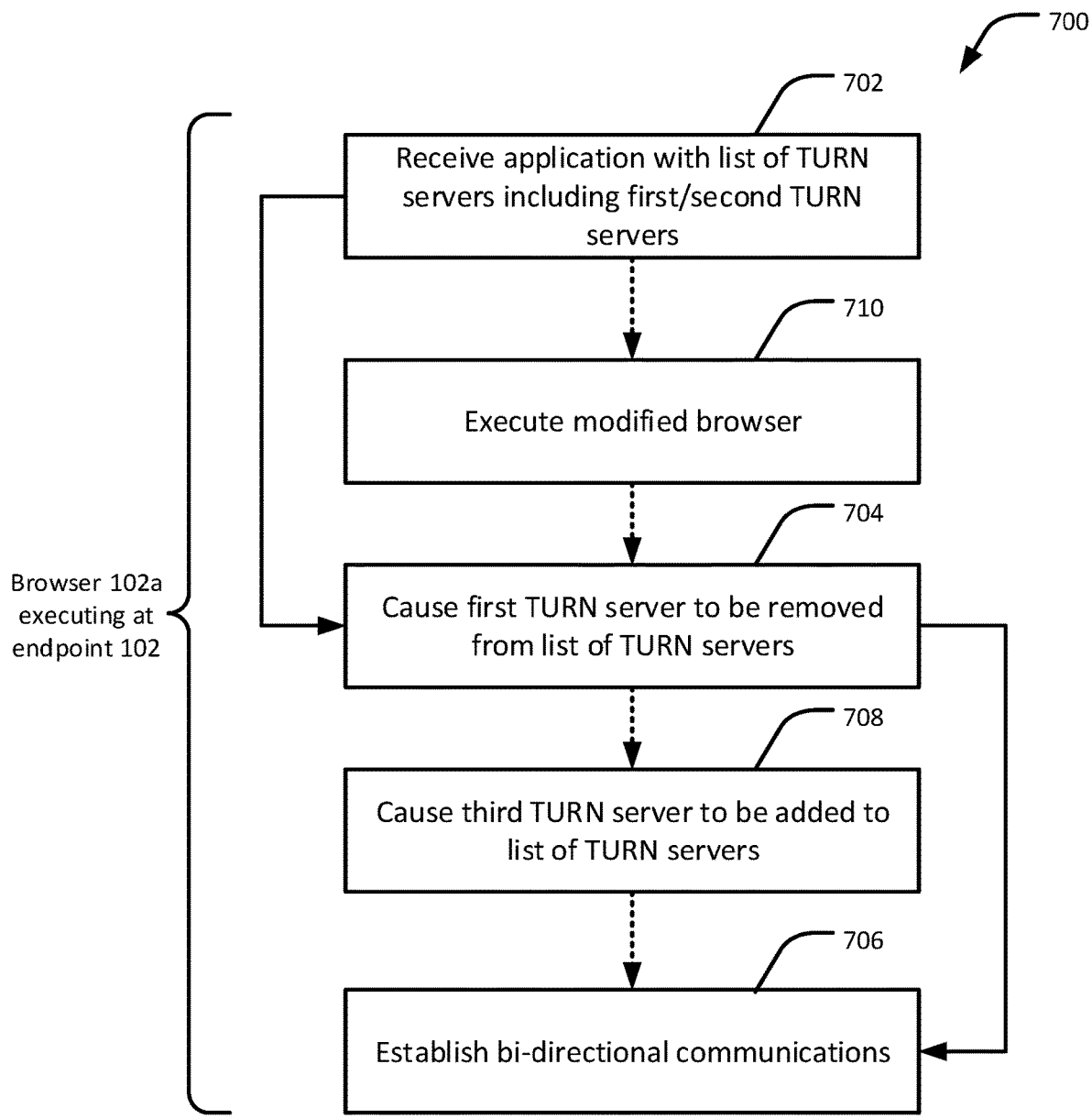
FIG. 7 is a flow diagram of another example method for adding and/or removing a TURN server, in accordance with an embodiment of the present disclosure.

FIG. 7 is a flow diagram of an example method 700 for adding and/or removing a TURN server, in accordance with an embodiment of the present disclosure. The method 700 can be implemented, for example, by a browser 102a, 104a or an application 120 executing at the endpoints Alice 102 or Bob 104, as described with respect to FIGS. 1 and 2. The method 700 includes receiving 702, by a first endpoint of a network, an application (such as application 120 of FIGS. 1, 2 and 5A-B) including a list of TURN servers for traversing at least a portion of the network during bi-directional communications between the first endpoint and a second endpoint of the network. The list of TURN servers includes a first TURN server and a second TURN server. The method 700 further includes causing 704, by the first endpoint, the first TURN server to be removed from the list of TURN servers such that the bi-directional communications between the first and second endpoints do not traverse the first TURN server removed from the list of TURN servers. For example, the first TURN server may be included in the original list of TURN servers provided by the application, but the policy specifies that the first TURN server should be removed from the list of TURN servers after the application has been downloaded to the endpoint (e.g., Alice 102 and/or Bob 104). The method 700 further includes establishing 706, by the first endpoint, bi-directional communications with the second endpoint via at least the second TURN server, which was in the original list of TURN servers provided by the application.

In some embodiments, the method 700 includes causing 708, by the first endpoint, a third TURN server specified by a policy to be added to the list of TURN servers. In some embodiments, the method 700 includes executing 710, by the first endpoint, a browser configured to add a third TURN server to the list of TURN servers and/or to remove the first TURN server from the list of TURN servers, in accordance with the policy. The browser can be modified as described in this disclosure to add and/or remove TURN servers from a list of TURN servers provided by an application. For example, in some embodiments, the method 700 can include modifying source code used to build the browser to configure the browser to receive, parse, and apply lists provided by the policy server (e.g., policies that specify addition of the third TURN server to the list of TURN servers and/or removal of the first TURN server from the list of TURN servers). In another example, in some embodiments the method 700 can include executing an extension to the browser to configure the browser apply lists as described above. Application of the list can, for example, add the third TURN server to the list of TURN servers and/or to remove the first TURN server from the list of TURN servers. In some embodiments, the application includes a WebRTC application. In some embodiments, the first TURN server is a public TURN server, and the third TURN server is a private TURN server.

Figure 9:
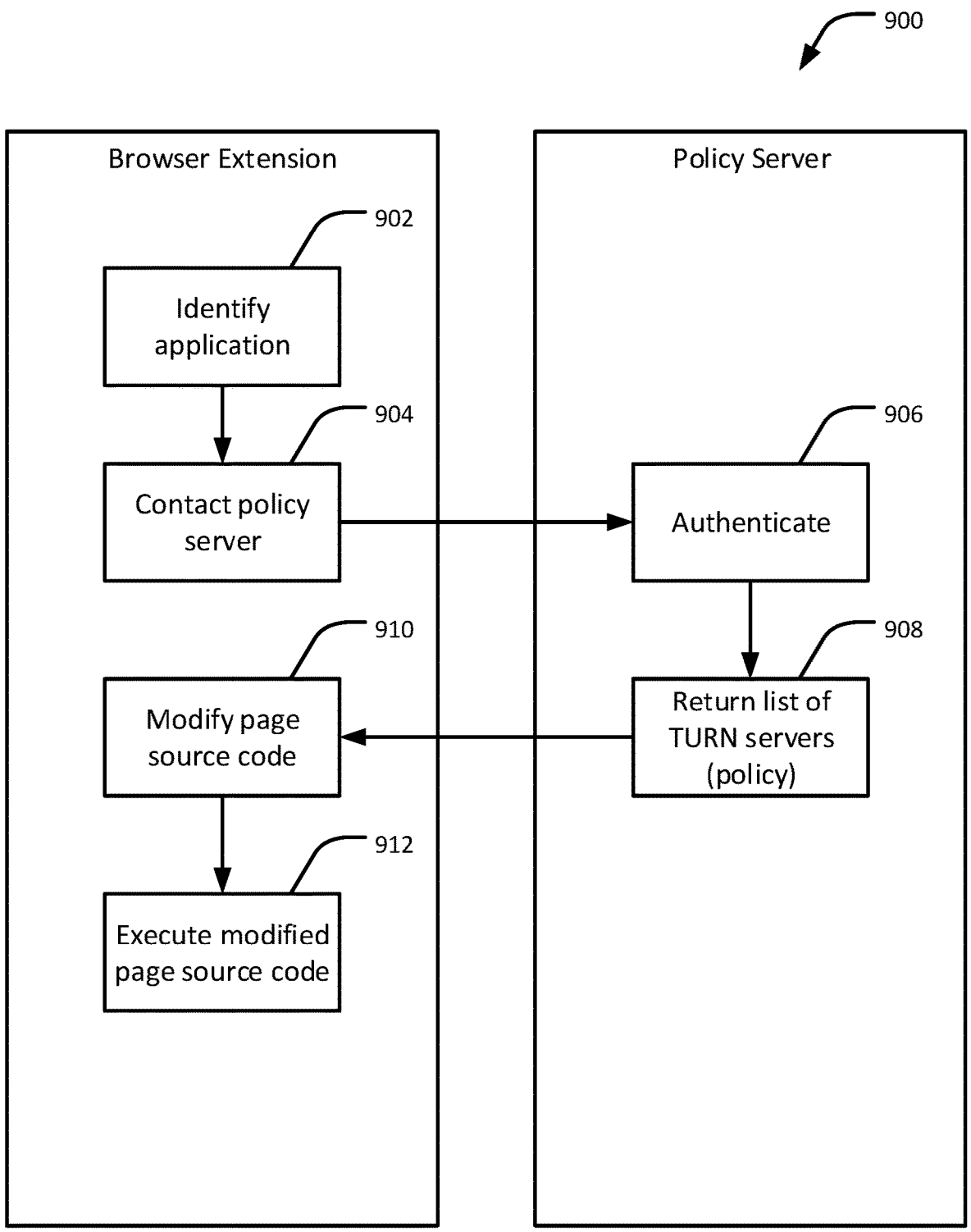
FIG. 9 is a flow diagram of an example method where the page source code of the application is modified using a browser extension, in accordance with an embodiment of the present disclosure.

FIG. 9 is a flow diagram of an example method 900 where the page source code of the application (e.g., JavaScript) is modified using a browser extension, in accordance with an embodiment of the present disclosure. In this example, the browser extension identifies 902 the application and contacts 904 the policy server, which authenticates 906 the user and/or the application and returns 906 a list of TURN servers associated with the identified application (according to the policy) to the browser extension. The browser extension modifies 910 the list of TURN servers within the page source code of the application to match the list of TURN servers retrieved from the policy server and executes 912 the modified page source code.

Figure 10:
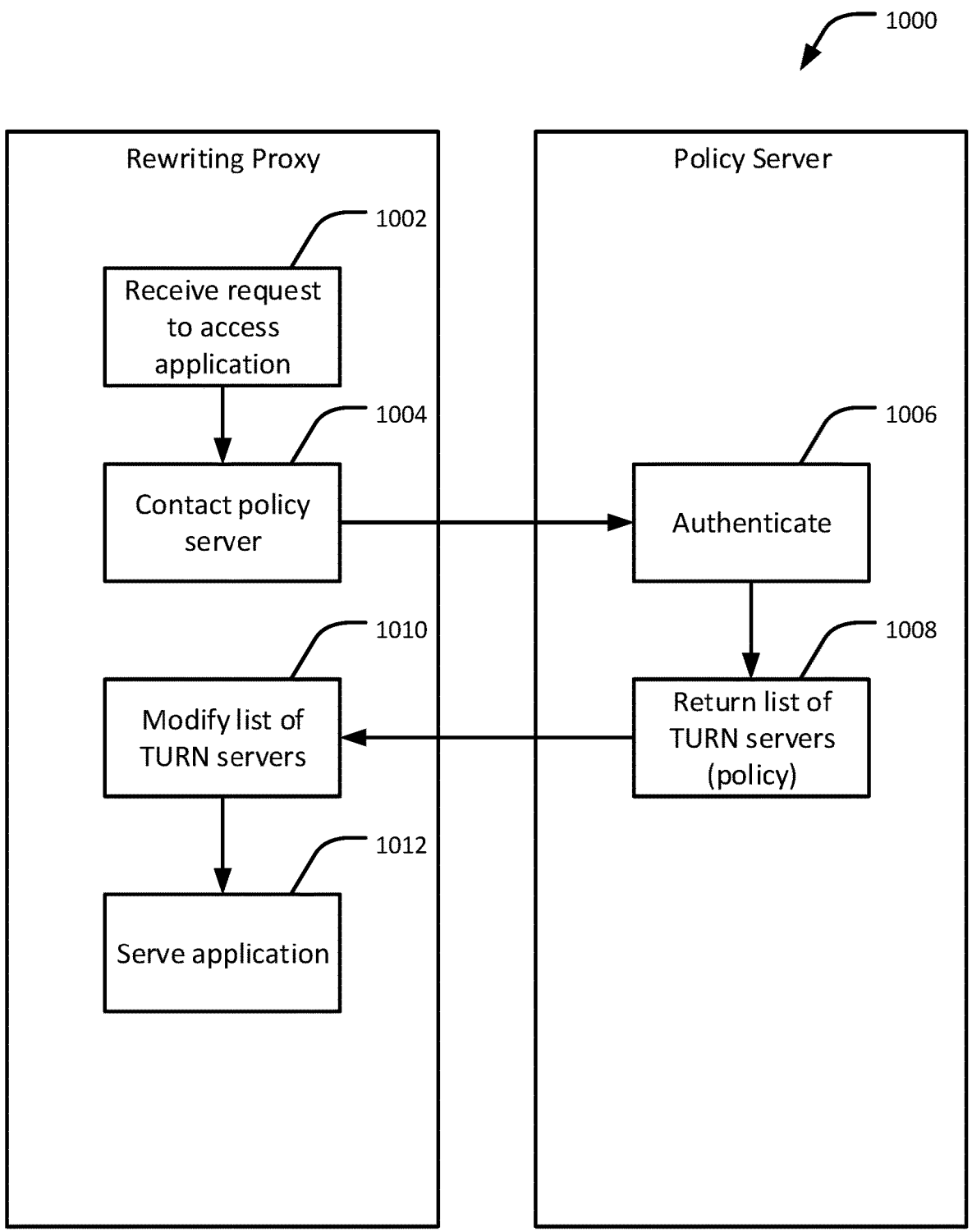
FIG. 10 is a flow diagram of an example method where the application is modified through a rewriting proxy, in accordance with an embodiment of the present disclosure.

FIG. 10 is a flow diagram of an example method 100 where the application is modified through a rewriting proxy, in accordance with an embodiment of the present disclosure. In these examples, in response to reception 1002 of a request from a browser to access the application, the rewriting proxy contacts 1004 the policy server, which authenticates 1006 the user and/or the application and returns 1008 a list of TURN servers associated with the application (according to the policy) to the rewriting proxy. The rewriting proxy modifies 1010 the list of TURN servers within the application source code to match the list of TURN servers retrieved from the policy server, and serves 1012 the application (with the modified list of TURN servers) to the browser.

Example source code used to modify a browser as described above is provided at the end of this description.

It will be appreciated that there are several advantages to the disclosed techniques. For example, the disclosed techniques can be used for TURN server selection, addition and/or removal for GDPR compliance. This can be implemented as a policy from the policy server to the browser. The policy specifies that certain TURN servers provided by the application should be removed because they are not compliant with GDPR policy when those TURN servers are in a different GDPR jurisdiction (for example, the user is located in France but the application provided a TURN server located in the United States). The policy server can determine the geolocation of user and/or the TURN servers by IP address, Autonomous System (AS) number, or other techniques.

In another example, the disclosed techniques can be used for TURN server selection, addition and/or removal for virtual local area network (VLAN) traversal within an enterprise. This can be implemented as a policy from the policy server to the browser. The policy specifies that the TURN servers are connected to the VLAN, similar to a TURN server connected to an enterprise-internal private network, which allows better routing than going up/down the enterprise's access link.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Example Computing Platform

Figure 8:
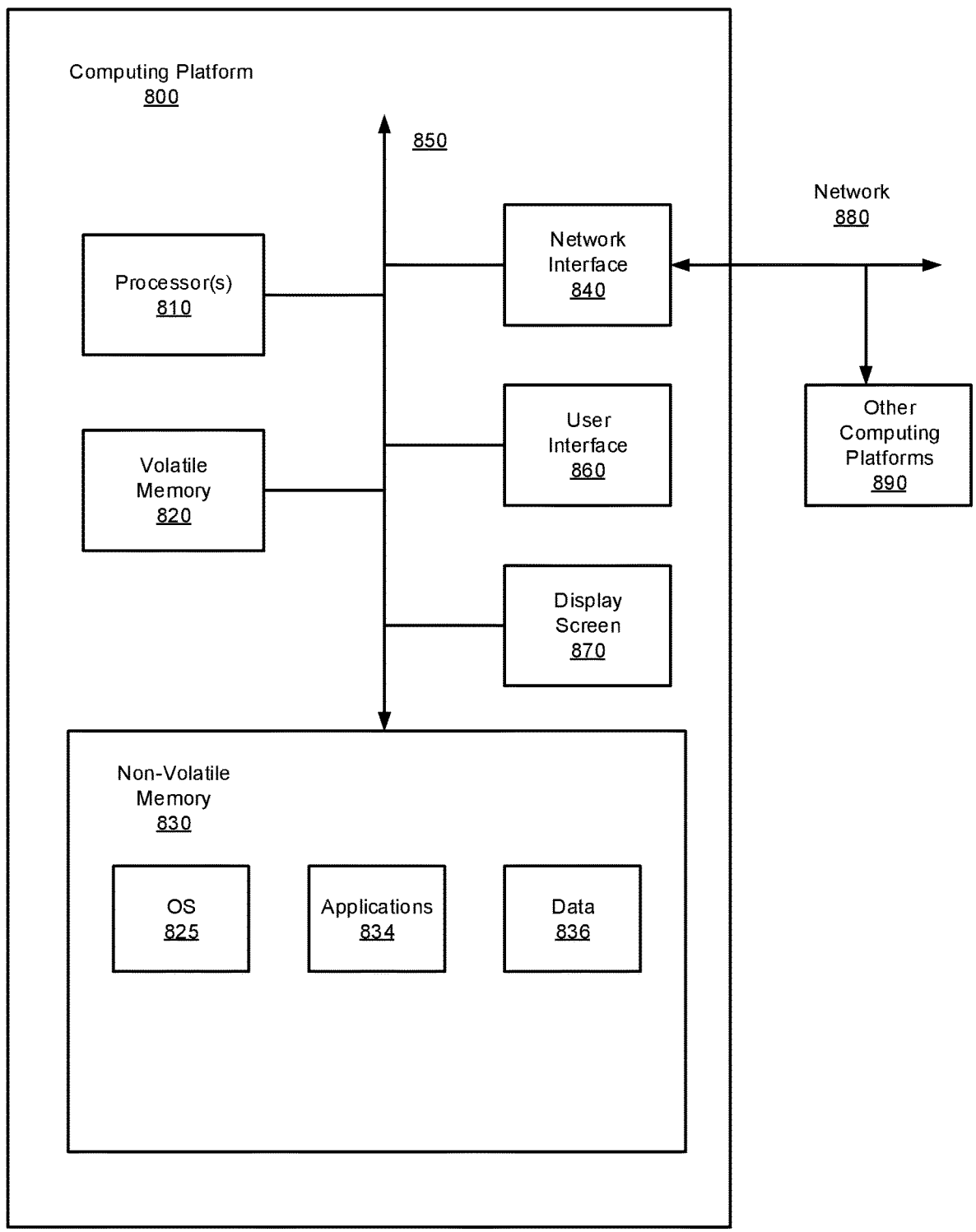
FIG. 8 is a block diagram of a computing platform configured to perform a process for modifying application-provided TURN servers, in accordance with an example of the present disclosure.

FIG. 8 is a block diagram of a computing platform 800 configured to perform a process for modifying application-provided TURN servers, in accordance with an example of the present disclosure. In some cases, the platform 800 may be a workstation, a laptop computer, a tablet, a mobile device, or any suitable computing or communication device.

The computing platform or device 800 includes one or more processors 810, volatile memory 820 (e.g., random access memory (RAM)), non-volatile memory 830, one or more network or communication interfaces 840, a user interface (UI) 860, a display screen 870, and a communications bus 850. The computing platform 800 may also be referred to as a computer or a computer system.

The non-volatile (non-transitory) memory 830 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 860 can include one or more input/output (I/O) devices (e.g., a mouse, a keyboard, a microphone, one or more speakers, one or more biometric scanners, one or more environmental sensors, and one or more accelerometers, etc.).

The display screen 870 can provide a graphical user interface (GUI) and in some cases, may be a touchscreen or any other suitable display device.

The non-volatile memory 830 stores an operating system ("OS") 825, one or more applications 834, and data 836 such that, for example, computer instructions of the operating system 825 and the applications 834, are executed by processor(s) 810 out of the volatile memory 820. In some examples, the volatile memory 820 can include one or more types of RAM and/or a cache memory that can offer a faster response time than a main memory. Data can be entered through the user interface 860. Various elements of the computer platform 800 can communicate via the communications bus 850.

The illustrated computing platform 800 is shown merely as an example computing device and can be implemented by any computing or processing environment with any type of machine or set of machines that can have suitable hardware and/or software capable of operating as described herein.

The processor(s) 810 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 810 can be analog, digital or mixed. In some examples, the processor 810 can be one or more physical processors that are local to the platform 800 or remote from the platform 800. A processor including multiple processor cores and/or multiple processors can provide functionality for parallel, simultaneous execution of instructions or for parallel, simultaneous execution of one instruction on more than one piece of data.

The network interfaces 840 can include one or more interfaces to enable the computing platform 800 to access a computer network 880 such as a Local Area Network (LAN), a Wide Area Network (WAN), a Personal Area Network (PAN), or the Internet through a variety of wired and/or wireless connections, including cellular connections. In some examples, the network 880 can include at least a portion of the Internet 106 and/or the network 108, such as shown in FIGS. 1 and 2. In some examples, the network 880 may allow for communication with other computing platforms 890, to enable distributed computing. In some examples, the network 880 may allow for communication with the one or more of the endpoints 102, 104, and the TURN servers 110, 112 of FIGS. 1 and 2.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Example Source Code for Modifying a Browser

In one example, the following example pseudo-code can be applied as a patch to a new browser build:

```
#include "third_party/webrtc/api/peer_connection_interface.h"
#include "third_party/webrtc/pc/session_description.h"
+#include <stdio.h>
namespace blink {
namespace {
        converted_ice_server.password = credential.Utf8( );
        ice_servers.emplace_back(std::move(converted_ice_server));
+ //add private TURN server to the application's TURN servers
+ auto ice_server =
webrtc::PeerConnectionInterface::IceServer( );
+ ice_server.urls.push_back("turn:private.turn.server");
+ ice_server.username = "scooby";
+ ice_server.password = "password123";
+       ice_servers.emplace_back(std::move(ice_server));
+ fprintf(stdout," added private turn server\n");
        }
      }
      web_configuration.servers = ice_servers.ReleaseVector( );
```

In another example, the following example JavaScript pseudo-code can be used to generate a browser extension:

```
console.log("executing inject.js");
//inject page.js from the bundle into the pages DOM and
excecute
var ss = document.createElement("script");
ss.src = chrome.runtime.getURL("page.js");
ss.onload = function( ) {this.remove( );};
(document.head || document.documentElement).appendChild(ss);
{
  "name": "WEBRTCHook",
  "version": "12",
  "manifest version": 2,
  "description": "WebRTC Hook Test",
  "homepage url": "https://www.citrix.com",
  "content_scripts": [
    {
      "matches": [
        "*://*/*"
      ],
      "js": ["inject.js"]
    }],
  "web_accessible_resources": ["page.js"],
  "browser_action": {
    "default_title": "WebRTC Hook"
  }
}
// this is the code which will be injected into a given
page...
var_typeof = typeof Symbol === "function" && typeof
Symbol.iterator === "symbol" ? function (obj) { return typeof
obj; } : function (obj) { return obj && typeof Symbol ===
"function" && obj.constructor === Symbol && obj !==
Symbol.prototype ? "symbol" : typeof obj; };
function shimCreateOffer(window) {
    //
https://github.com/webrtcHacks/adapter/issues/998#issuecomment
-516921647
    // https://bugzilla.mozilla.org/show_bug.cgi?id=1396918
    if (!((typeof window === 'undefined' ? 'undefined':
_typeof(window)) === 'object' && window.RTCPeerConnection)) {
        return;
    }
    console.log("hooking createOffer");
    var origCreateOffer =
window.RTCPeerConnection.prototype.createOffer;
    window.RTCPeerConnection.prototype.createOffer = function
createOffer( ) {
        console.log("hello from createOffer");
        return origCreateOffer.apply(this, arguments);
    };
}
function shimCreateAnswer(window) }
    //
https://github.com/webrtcHacks/adapter/issues/998#issuecomment
-516921647
    // Firefox ignores the init sendEncodings options passed to
addTransceiver
    // https://bugzilla.mozilla.org/show_bug.cgi?id=1396918
    if (!((typeof window === 'undefined' ? 'undefined':
_typeof(window)) === 'object' && window.RTCPeerConnection)) {
        return;
    }
    console.log("hooking createAnswer");
    var origCreateAnswer =
window.RTCPeerConnection.prototype.createAnswer;
    window.RTCPeerConnection.prototype.createAnswer = function
createAnswer( ) {
        console.log("hello from createAnswer");
        return origCreateAnswer.apply(this, arguments);
    };
}
// Wraps the peerconnection event eventNameToWrap in a
function
// which returns the modified event object (or false to
prevent
// the event).
function wrapPeerConnectionEvent(window, eventNameToWrap,
wrapper) {
  if (!window.RTCPeerConnection) {
      return;
  }
  var proto = window.RTCPeerConnection.prototype;
  var nativeAddEventListener = proto.addEventListener;
  proto.addEventListener = function (nativeEventName, cb) {
      if (nativeEventName !== eventNameToWrap) {
        return nativeAddEventListener.apply(this, arguments);
      }
      var wrappedCallback = function wrappedCallback(e) {
        var modifiedEvent = wrapper(e);
        if (modifiedEvent) {
          cb(modifiedEvent);
        }
      };
      this._eventMap = this._eventMap || {};
      this._eventMap[cb] = wrappedCallback;
      return nativeAddEventListener.apply(this,
[nativeEventName, wrappedCallback]);
  };
  var nativeRemoveEventListener = proto.removeEventListener;
  proto.removeEventListener = function (nativeEventName, cb) {
      if (nativeEventName !== eventNameToWrap || !this._eventMap
|| !this._eventMap[cb]) {
        return nativeRemoveEventListener.apply(this, arguments);
      }
      var unwrappedCb = this._eventMap[cb];
```

-continued

```
    delete this._eventMap[cb];
    return nativeRemoveEventListener.apply(this,
[nativeEventName, unwrappedCb]);
  };
Object.defineProperty(proto, 'on' + eventNameToWrap, {
  get: function get( ) {
    return this['_on' + eventNameToWrap];
  },
  set: function set(cb) {
    if (this['_on' + eventNameToWrap]) {
      this.removeEventListener(eventNameToWrap, this['_on' +
eventNameToWrap]);
      delete this['_on' + eventNameToWrap];
    }
    if (cb) {
      this.addEventListener(eventNameToWrap, this['_on' +
eventNameToWrap] = cb);
    }
  },
  enumerable: true,
  configurable: true
  });
}
function shimRTCIceCandidate(window) {
  // foundation is arbitrarily chosen as an indicator for full
support for
  // https://w3c.github.io/webrtc-pc/#rtcicecandidate-
interface
  if (!window.RTCIceCandidate) {
    return;
  }
  console.log("hooking RTCIceCandidate");
  var NativeRTCIceCandidate = window.RTCIceCandidate;
  window.RTCIceCandidate = function RTCIceCandidate(args) {
  console.log("hello from shimRTCIceCandidate");
    return new NativeRTCIceCandidate(args);
  };
  window.RTCIceCandidate.prototype =
NativeRTCIceCandidate.prototype;
  // Hook up the augmented candidate in onicecandidate and
  // addEventListener('icecandidate', ...)
wrapPeerConnectionEvent(window, 'icecandidate', function (e)
{
    if (e.candidate) {
      Object.defineProperty(e, 'candidate', {
        value: new window.RTCIceCandidate(e.candidate),
        writable: 'false'
      });
    }
    return e;
  });
}
shimCreateOffer (window);
shimCreateAnswer (window);
shimRICIceCandidate (window);
```

What is claimed is:

1. A method comprising:

receiving, by a first endpoint of a network, an application providing a list of Traversal Using Relays around Network Address Translators (TURN) servers, each of the TURN servers configured to relay network traffic across at least a portion of the network during bi-directional communications between the first endpoint and a second endpoint of the network, the list of TURN servers including a first TURN server and a second TURN server each different from the first endpoint, wherein the first TURN server is a public TURN server, and wherein the second TURN server is a private TURN server;

receiving, from a policy server, a policy specifying one or more TURN servers to be added to or removed from the list of TURN servers provided by the application;

modifying, by and at the first endpoint, the list of TURN servers to at least one of:

add a third TURN server specified by the policy to the list of TURN servers; and/or remove the first TURN server specified by the policy from the list of TURN servers such that the bi-directional communications between the first and second endpoints do not traverse the first TURN server removed from the list of TURN servers; and establishing, by the first endpoint, bi-directional communications with the second endpoint via at least one TURN server in the modified list of TURN servers.

2. The method of claim 1, further comprising executing a browser modified to add the third TURN server to the list of TURN servers and/or to remove the first TURN server from the list of TURN servers.

3. The method of claim 1, further comprising executing an extension to the browser configured to add the third TURN server to the list of TURN servers and/or to remove the first TURN server from the list of TURN servers.

4. The method of claim 1, further comprising validating, by the first endpoint, that the policy authorizes that the application and/or a browser user to use at least the second or third TURN servers for the bi-directional communications.

5. The method of claim 4, further comprising obtaining, by the first endpoint, TURN credentials in response to authorizing that that the application and/or a browser user to use at least the second or third TURN servers for the bi-directional communications.

6. The method of claim 1, wherein the application includes a JavaScript WebRTC application.

7. A system comprising:

a storage; and at least one processor operatively coupled to the storage, the at least one processor configured to execute instructions stored in the storage that when executed cause the at least one processor to carry out a process including receiving, by a first endpoint of a network, an application providing a list of Traversal Using Relays around Network Address Translators (TURN) servers, each of the TURN servers configured to relay network traffic across at least a portion of the network during bi-directional communications between the first endpoint and a second endpoint of the network, the list of TURN servers including a first TURN server and a second TURN server each different from the first endpoint, wherein the first TURN server is a public TURN server, and wherein the second TURN server is a private TURN server;

receiving, from a policy server, a policy specifying one or more TURN servers to be added to or removed from the list of TURN servers provided by the application;

modifying, by and at the first endpoint, the list of TURN servers to at least one of:

add a third TURN server specified by the policy to the list of TURN servers; and/or remove the first TURN server specified by the policy from the list of TURN servers such that the bi-directional communications between the first and second endpoints do not traverse the first TURN server removed from the list of TURN servers; and establishing, by the first endpoint, bi-directional communications with the second endpoint via at least one TURN server in the modified list of TURN servers.

8. The system of claim 7, wherein the process includes executing a browser modified to add the third TURN server to the list of TURN servers and/or to remove the first TURN server from the list of TURN servers.

9. The system of claim 7, wherein the process includes executing an extension to the browser configured to add the third TURN server to the list of TURN servers and/or to remove the first TURN server from the list of TURN servers.

10. The system of claim 7, wherein the process includes validating, by the first endpoint, that the policy authorizes that the application and/or a browser user to use at least the second or third TURN servers for the bi-directional communications.

11. The system of claim 10, wherein the process includes obtaining, by the first endpoint, TURN credentials in response to authorizing that that the application and/or a browser user to use at least the second or third TURN servers for the bi-directional communications.

12. The system of claim 7, wherein the application includes a JavaScript WebRTC application.

13. A computer program product including one or more non-transitory machine-readable mediums having instructions encoded thereon that when executed by at least one processor cause a process to be carried out, the process comprising:
  receiving, by a first endpoint of a network, an application providing a list of Traversal Using Relays around Network Address Translators (TURN) servers, each of the TURN servers configured to relay network traffic across at least a portion of the network during bi-directional communications between the first endpoint and a second endpoint of the network, the list of TURN servers including a first TURN server and a second TURN server each different from the first endpoint, wherein the first TURN server is a public TURN server, and wherein the second TURN server is a private TURN server;
  receiving, from a policy server, a policy specifying one or more TURN servers to be added to or removed from the list of TURN servers provided by the application;
  modifying, by and at the first endpoint, the list of TURN servers to at least one of:
    add a third TURN server specified by the policy to the list of TURN servers; and/or
    remove the first TURN server specified by the policy from the list of TURN servers such that the bi-directional communications between the first and second endpoints do not traverse the first TURN server removed from the list of TURN servers; and
  establishing, by the first endpoint, bi-directional communications with the second endpoint via at least one TURN server in the modified list of TURN servers.

14. The computer program product of claim 13, wherein the process includes executing a browser modified to add the third TURN server to the list of TURN servers and/or to remove the first TURN server from the list of TURN servers.

15. The computer program product of claim 13, wherein the process includes executing an extension to the browser configured to add the third TURN server to the list of TURN servers and/or to remove the first TURN server from the list of TURN servers.

16. The computer program product of claim 13, wherein the process includes validating, by the first endpoint, that the policy authorizes that the application and/or a browser user to use at least the second or third TURN servers for the bi-directional communications.

17. The computer program product of claim 16, wherein the process includes obtaining, by the first endpoint, TURN credentials in response to authorizing that that the application and/or a browser user to use at least the second or third TURN servers for the bi-directional communications.

18. The computer program product of claim 13, wherein the application includes a JavaScript WebRTC application.

* * * * *